UNITED STATES PATENT OFFICE 2,058,739

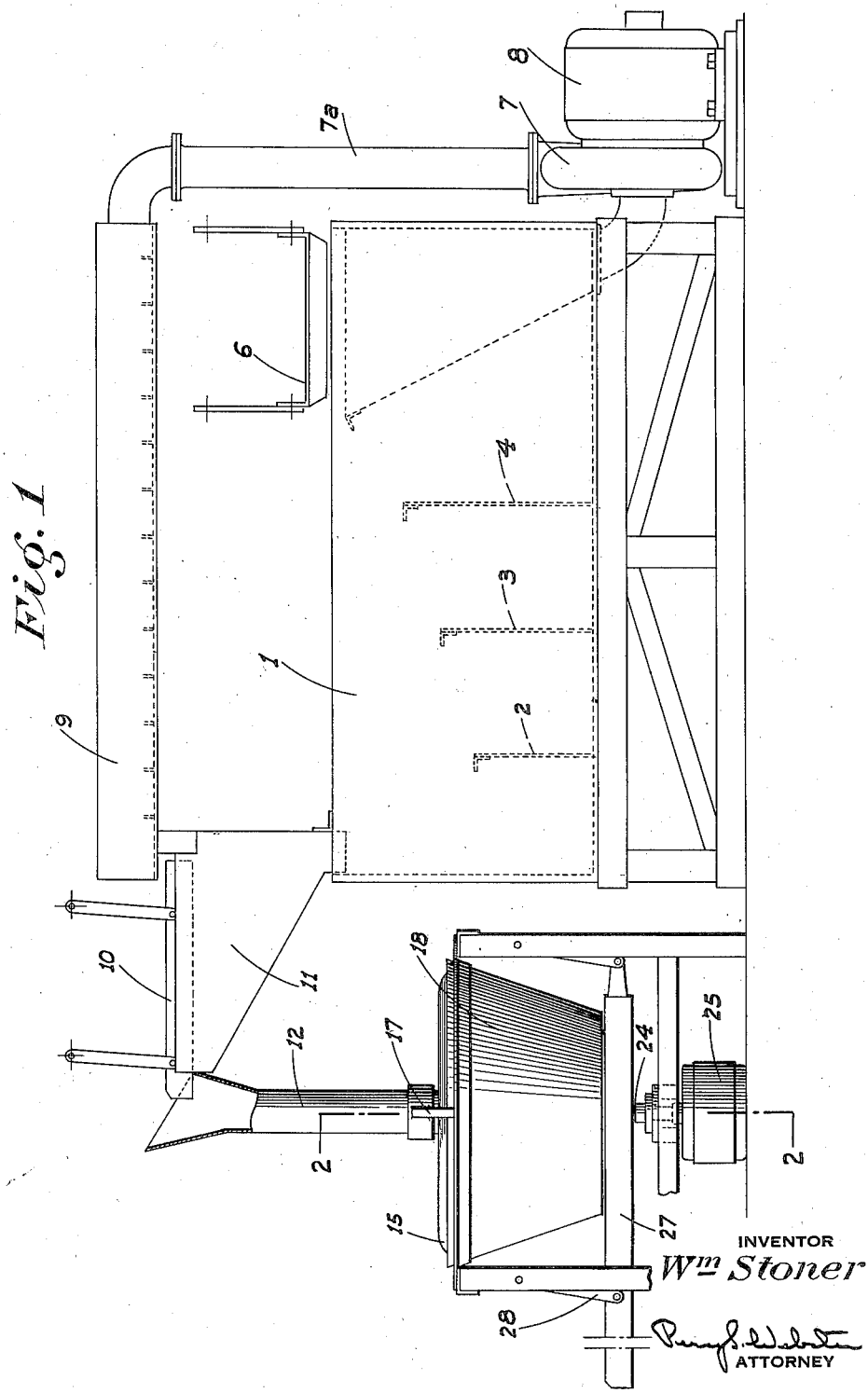

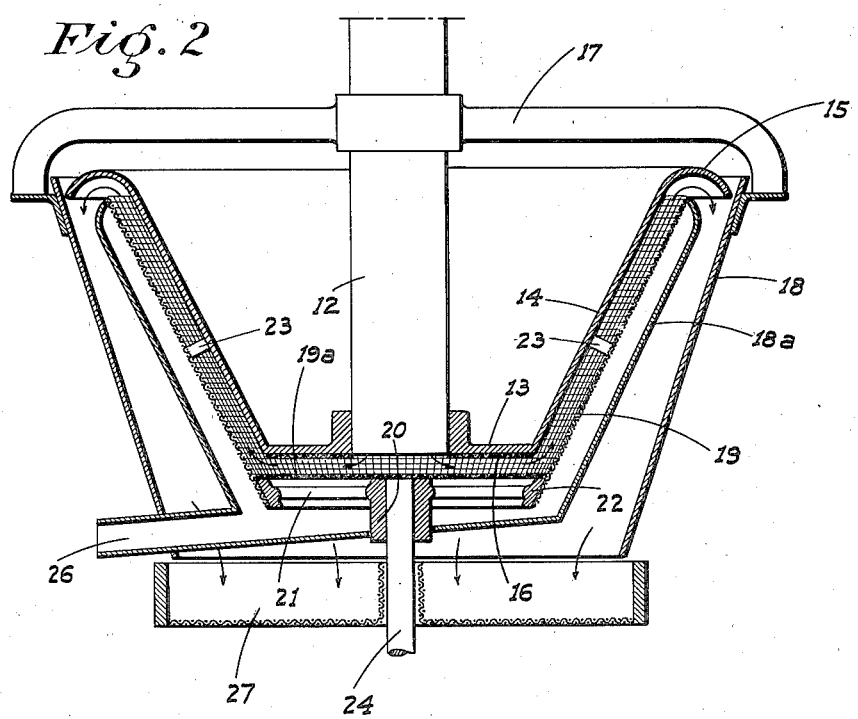
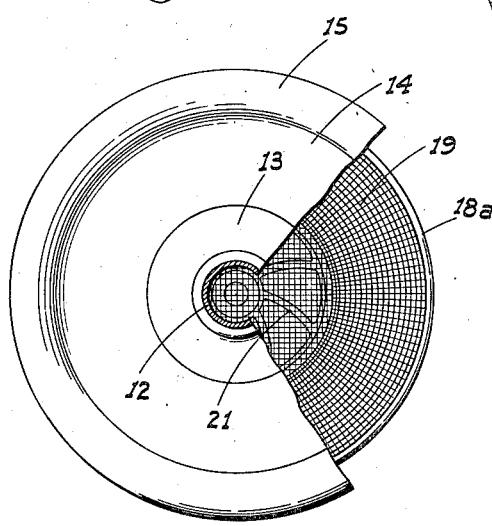
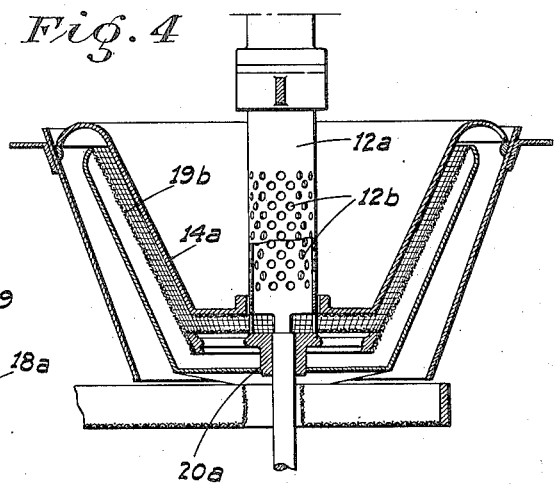

DRIER

William Stoner, Fresno, Calif.

Application December 17, 1934, Serial No. 757,911

7 Claims. (Cl. 210—68)

This invention relates primarily to driers for extracting and dissipating water from raisins after they have been subjected to a washing and cleansing action.

The principal object of the invention is to provide a drier of the centrifugal type which will continuously and rapidly move the wet raisins through the same and during such movement thereof will completely dry the raisins of all water which has accumulated thereon during the washing operation.

Another object of the invention is to provide a drier through which the wet raisins may be passed in a continuous stream in order that the drying action may be continuous and as rapid as possible in order to reduce the time and labor cost of handling the raisins.

A still further object of the invention is to provide a simple mechanism and one which may be readily assembled and taken apart for repair and cleansing purposes.

These objects I accomplish by such combination and arrangement of parts as will more fully appear by a perusal of the following specification and claims.

In the drawings similar characters of reference indicate corresponding parts in the several views:

Figure 1 is a side elevation showing in outline form the preferred raisin washing and cleansing system which terminates in delivery of the cleansed raisins to my improved drier.

Figure 2 is a cross sectional view of the drier taken on a line 2—2 of Figure 1.

Figure 3 is a top plan view of the drier partly broken out.

Figure 4 is a cross sectional view similar to Figure 2, but showing a modified form of construction of the drier.

Referring now more particularly to the characters of reference on the drawings, the numeral 1 indicates a water supply trough having a series of settling baffle plates 2, 3 and 4 arranged at progressively different levels, and a delivery chute 5, the upper open end of which is just below the top level of the trough so that water from the trough will lap over into said chute 5. The raisins to be washed are delivered from a shaker conveyor 6 into the trough 5 and the raisins and water from the trough are withdrawn therefrom by a pump 7, driven by a motor 8, and lifted through a pipe 7a onto a series of riffles 9.

The water and raisins flow down these riffles and small rocks, nails, grits and other heavy debris, which is usually accumulated with the raisins when they have come from the drying fields or dehydrators, are caught by the riffles. The raisins and water thus freed of debris are delivered onto a shaker screen 10 where the water carrying the dissolved silt and dirt from the raisins is shaken from the raisins onto a chute 11. This chute 11 discharges the dirty water back into the trough 1 where the silt and dirt etc. settles behind the settling baffles 3 so that clear water finally reaches to the upper end of the chute 5 ready for re-use in the cleaning of additional raisins.

The shaking screen 10 delivers the cleansed but wet raisins into my improved drier. This drier comprises a center open ended tube 12 around the bottom end of which is rotatably mounted the base 13 of a concave bowl 14, the sides of which are imperforate. This bowl has a curved overhanging top flange 15. On the bottom of the flange 15 and around the open end of the tube 12 is fixed a wire mesh 16, the function of which will be presently described. The tube 12 is supported in a bracket frame 17 extending outwardly from a concave trough 18 which is disposed around the outer periphery of the flange 15 and the walls of which trough 18 are spaced from the walls of the bowl 14.

Spaced from the bowl 14 is a similar shaped bowl 19 the sides and bottoms of which are of foraminous material, such as wire mesh or the like. This foraminous bowl is supported at the lower end upon a casting which comprises a hub 20 extending outwardly from which are radial curved ribs 21 supporting at their outer edges a flange 22. The bottom screen 19a of the bowl 19 extends across the top of the ribs 21 and is secured to the flange 22 and the side screens of the bowl 19 extend over the side faces of the flange 22 and are secured thereto. Spacer blocks 23 may be interposed between the bowl 14 and the bowl 19 to hold the walls thereof properly spaced apart. These blocks may be of any size and placed at convenient points where their function will be most effective.

The hub 20 is mounted on a shaft 24 projecting upwardly from a motor 25 so that with the operation of the motor the bowl 19 may be rotated at high speed. In lieu of the use of the motor 25 motion may be imparted to the shaft 24 by suitable belt or other common form of drive.

The walls of an inner trough 18a which is interposed between the trough 18 and the bowl 19 terminate at its upper edge closely adjacent the upper edge of the bowl 19, and as already indicated the walls of the trough 18 terminate adjacent the outer periphery of the flange 15 and are in spaced relation to the walls of the trough 18a. It will therefore be apparent that there is a continuous space down through the tube 12 between the bottoms 13 and 19a of the two bowls 14 and 19, thence up between the side walls of the bowls, and thence over between the upper edges of the trough 18a and the flanges 15. The trough 18a is provided with an outlet drain 26.

Underneath the trough 18 which has an open bottom is provided a shaker conveyor screen 27 adapted to be driven in any suitable manner from hangers 28.

In practice the wet raisins which are delivered from the shaker screen 10 pass down through the tube 12 and between the two bowls 14 and 19. These bowls are rapidly driven through the medium of the shaft 24 so as to set up a centrifugal action and this action carries the raisins in a stream up between the side walls of the bowls 14 and 19 and thence over underneath the flange 15 into the space between the troughs 18 and 18a. This centrifugal action drives the water from the raisins through the foraminous bottom and side walls of the bowl 19 and into the trough 18a where it is drained off through the outlet drain 26. The raisins thus freed of their water discharge into the trough 18 and down through the open end thereof onto the shaker screen 28 from which they are conveyed to any desired point. The spacer blocks 23 are tapered at each edge so as to present a stream line effect which will not interfere with the free passage of the fruit.

If there are any small projecting stems on the raisins as they move between the bottom flanges 13 and 19a these tend to catch in the screen 16 and to be loosened from the raisins and then when the raisins drop upon the shaker screen 27 these stems as separated from the raisins drop through the screen.

While I have spoken of the bowl 19 and the member 16 as being of wire mesh, it will be understood that this may be made of other material which is perforate. For instance, they could be made of rubber which would be sufficiently smooth and soft to prevent injury to the fruit passing through the drier.

In Figure 4 is shown a modified view in which the tube 12a is definitely fixed to the casting 20a and is provided with holes 12b. In this construction the tube 12a, the bowl 14a, and the bowl 19b would rotate as a unit and therefore further extraction of the water might be had in the tube 12a itself, such water being thrown into the bowl 14a and then with the rotation of the bowl being thrown out over the top thereof.

From the foregoing description it will be quite readily apparent that my improved drier provides for a continuous stream of clean but wet raisins to be moved through the drier by the centrifugal action of the rotating bowls. One of said bowls being foraminous, the water from the raisins is thrown therethrough by the centrifugal action and the dried raisins are then carried out from the drier and discharged therefrom and carried to any desired location. The mechanism being once set in motion a large stream of raisins may be continuously dried with a very minimum amount of expense of time and labor and a very effective cleaning and drying system is provided for handling the raisins.

While described as being particularly useful in the drying of raisins, my invention is of course capable of general application in the drying of all kinds of dried fruits after they have been washed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A raisin drier comprising a driven shaft, a hub on the shaft, spaced ribs extending radially from the hub, a flange on the outer ends of the ribs, a perforate sheet mounted over the ribs and flange, a perforate concave bowl secured to the flange, a second concave bowl spaced inwardly from the first bowl, and means to feed raisins between the bowls.

2. A raisin drier comprising an imperforate concave bowl, a perforate sheet disposed over the outside of the bottom of such bowl, a second perforate concave bowl spaced outwardly from the first bowl, means to impart rotation to the second bowl, and means to feed raisins between the bowls.

3. A raisin drier comprising a pair of spaced bowls the bottoms of which are parallel and relatively close to each other, means to feed raisins into the space between the bottoms of the bowls centrally thereof, means to rotate the outer bowl whereby the raisins resting on the bottom thereof will move centrifugally and against the side wall of said bowl, and friction sheets over the adjacent surfaces of the bottoms of the bowls to engage and loosen any stems on the raisins thus moving.

4. A raisin drier comprising a pair of spaced bowls, the walls of one bowl being perforated, means to feed a stream of raisins to the space between the bowls, such means comprising a central tube into which the raisins are adapted to be delivered and freely open at the bottom into the space between the bowls, and means to rotate the tube; said tube being freely perforated from its lower end upwardly a certain distance.

5. A structure as in claim 3 in which the bottom friction sheet on the outer bowl is of open mesh material, there being an opening in the bottom of the outer bowl below said sheet whereby any stems separated from the raisins by the frictional action of the sheets may drop through said bottom sheet and clear of the bowls.

6. A raisin drier comprising a pair of spaced bowls the bottoms of which are parallel and relatively close to each other, means to feed raisins into the space between the bottoms of the bowls centrally thereof, means to rotate one bowl relative to the other; the bottoms of both bowls being of screen material whereby to exert a stem loosening action on the raisins disposed between said bottoms.

7. A raisin drier comprising a pair of spaced bowls the bottoms of which are parallel and relatively close to each other, means to feed raisins into the space between the bottoms of the bowls centrally thereof, and means to rotate one bowl relative to the other; the bottoms of both bowls being provided with friction surfaces whereby to exert a rolling and stem loosening action on the raisins disposed between said bottoms and coming in contact therewith.

WILLIAM STONER.